United States Patent
Gonthier et al.

(10) Patent No.: US 6,643,433 B2
(45) Date of Patent: Nov. 4, 2003

(54) POLARIZATION-COMBINING FUSED-FIBER OPTICAL COUPLER AND METHOD OF PRODUCING THE SAME

(75) Inventors: François Gonthier, Ville Mont-Royal (CA); Bruno Y. Dion, Vaudreuil-Dorion (CA); Pierre Cottin, Ottawa (CA)

(73) Assignee: ITF Optical Technologies Inc., Ville St-Laurent (CA)

( * ) Notice: Subject to any disclaimer, the term of this patent is extended or adjusted under 35 U.S.C. 154(b) by 12 days.

(21) Appl. No.: 10/039,571

(22) Filed: Jan. 7, 2002

(65) Prior Publication Data

US 2003/0031415 A1 Feb. 13, 2003

(30) Foreign Application Priority Data

Aug. 8, 2001 (CA) ............................................. 2354903

(51) Int. Cl.[7] ................................................ G02B 6/27
(52) U.S. Cl. ............................. 385/43; 385/11; 385/42; 385/27; 385/39
(58) Field of Search ............................... 385/15, 27, 30, 385/39, 11, 41, 42, 43, 50, 51

(56) References Cited

U.S. PATENT DOCUMENTS

| | | | |
|---|---|---|---|
| 5,064,267 A | | 11/1991 | Rossberg ...................... 385/50 |
| 5,129,019 A | * | 7/1992 | Robberg et al. ............... 385/42 |
| 5,420,949 A | * | 5/1995 | Arima et al. .................. 285/43 |
| 5,740,288 A | * | 4/1998 | Pan .............................. 285/11 |
| 6,522,796 B1 | * | 2/2003 | Ziari et al. ..................... 385/11 |

FOREIGN PATENT DOCUMENTS

| | | | |
|---|---|---|---|
| JP | 02293802 A | * 12/1990 | ............ G02B/6/28 |
| JP | 05224075 A | *  9/1993 | ............ G02B/6/28 |
| WO | WO 0137013 | 5/2001 | ........... G02B/6/287 |

OTHER PUBLICATIONS

"Single–Mode Fused Biconical Coupler Optimized for Polarization Beamsplitting", Eisenmann et al, Journal of Lightwave Technology, vol. 9, No. 7, Jul. 1991, pp. 853–858.*
A.W. Snyder, Polarising Beamsplitter From Fused–Taper Couplers, May 2, 1985, pp 623–625, Canberra, Australia.

* cited by examiner

Primary Examiner—Hemang Sanghavi
Assistant Examiner—Scott A Knauss
(74) Attorney, Agent, or Firm—George J. Primak

(57) ABSTRACT

A polarization-combining fused-fiber optical coupler is made of polarization maintaining (PM) fibers spliced to non-birefringent single mode (SM) fibers which are fused and drawn near the splicing to form a coupler with an adiabatic tapered profile. The linearly polarized light injected into PM fibers travels through the coupler where the power of the two polarizations is combined and transmitted to one output fiber. The method for producing such coupler involves splicing a pair of PM fibers to a pair of SM fibers, then injecting linearly polarized light into each PM fiber and fusing and drawing SM fibers to form an adiabatic coupler with maximum power transmission at a desired wavelength going to only one output fiber.

24 Claims, 2 Drawing Sheets

POLARIZATION-COMBINING FUSED-FIBER OPTICAL COUPLER AND METHOD OF PRODUCING THE SAME

BACKGROUND OF THE INVENTION

1. Field of the Invention

The present invention relates to a polarization-combining fiber-fused optical coupler which, in the reverse mode, can also serve as a polarization beam splitter. The invention also relates to a method of manufacturing such coupler by splicing two polarization maintaining (PM) fibers to a pair of standard non-birefringent single mode (SM) fibers and forming a coupling zone near the splicing with the SM fibers by fusing and drawing the same until a desired power transfer is achieved.

2. Description of the Prior Art

Fused and tapered 2×2 couplers, formed by fusing together sections of two laterally adjacent optical fibers and by subsequently drawing these fused sections are well known in the art. They are versatile devices that can be used in many applications. Their most common functions are optical power splitting and wavelength division multiplexing (WDM). However, WDM devices can only divide or combine optical signals of different wavelengths.

A fused-tapered fiber-optic coupler, if properly designed, can also function as a polarization beam splitter (PBS). Fiber optic PBS couplers separate light power into two orthogonal polarizations. The form birefringence, which produces a difference in the propagation constants between orthogonal polarized states, causes the polarization splitting in the coupler. A fiber optic PBS coupler is used for providing polarization sensitive devices with light signals having known polarization states.

Fiber optic polarization-combining couplers combine the power of two

Fiber optic polarization-combining couplers combine the power of two orthogonal polarizations into one single output fiber. One of ordinary skill in the art will recognize that such an optical device is bidirectional and operates in a reverse fashion from what is described above with respect to the polarization beam splitter. A polarization combiner permits to introduce beams of linearly polarized light from two light sources and combine them within a single common optical fiber.

Polarization beam-splitting properties of fused taper couplers have been known since 1985, when they were disclosed by A. W. Snyder in the article entitled "Polarizing Beamsplitter from Fused-Taper Couplers", published in Electronic Letters of Jul. 4, 1985, Vol. 21, No. 14, pp623–625.

In this regard, it should be noted that a fused-fiber coupler is made of two laterally fused SM fibers, forming a structure which has two transversely symmetrical axes. Geometrically, these axes are axes of birefringence of the coupler, namely the x-axis which passes by the two cores of the fibers and the y-axis which is perpendicular to the x-axis.

The transmission of the coupler, if it is excited by one of the input arms can be represented as follows:

$P_1 = a_x^2 \cos^2(\phi_x) + a_y^2 \cos^2(\phi_y)$ $P_2 = a_x^2 \sin^2(\phi_x) + a_y^2 \sin^2(\phi_y)$ where $P_1$ is the power at the output of the first arm, $P_2$ is the power at the output of the second arm, $\phi_x$ and $\phi_y$ are accumulated phases in the coupler according to polarizations x and y, and $a_x$ and $a_y$ are amplitudes of the signal at the coupler input according to the polarization axes.

Since the accumulated phases of $\phi_x$ and $\phi_y$ are different, a coupler will have a different response according to the polarizations at the input of the coupler. Here, one can distinguish two particular situations: (1) when the accumulated phases are in phase (equal to a multiple of $2\pi$) and have a value which is a multiple of $\pi$, the power at the input will go to one or the other output fiber; this property of matched phases is used to make multiplexers of wavelength with little dependence on polarization; (2) in the second case, if the accumulated phases are out of phase (equal to about $(2n+1)\pi$, i.e. an odd-multiple of $\pi$) and have a value which is a multiple of $\pi$, the two polarizations will be separate and each will go into a separate fiber. An example of this latter case would be, $\phi_x = m\pi$ and $\phi_y = (m\pm 1)\pi$, meaning that each accumulated phase is a different multiple of $\pi$. It should be noted that in all references to a multiple of $\pi$ or of $2\pi$ or the like, the values need not be an exact multiple, but could be an approximate multiple, i.e. essentially such a multiple.

Moreover, U.S. Pat. No. 5,064,267 issued Nov. 12, 1991 to Rossberg, discloses a method of manufacturing a polarization-selective coupler, in which, during the formation of the coupling region, linearly polarized light of a selected wavelength is fed into one of the input fibers, and the coupling region is drawn-out until an equal amount of light is detected from each output fiber, at which point the source of heat is turned off, thereby stopping the elongation of the coupling region. This technique is unsatisfactory because it does not properly measure the polarization state in the coupler and, in particular, it does not measure such state at the wavelength of the operation of the coupler. Also, the technique is not sufficiently precise, as it provides for feeding only one state of polarized light into only one of the input fibers, while the other input fiber remains unused during the formation of the coupler. Thus, it only achieves a partial combining of the power, and due to this, such measurement cannot guarantee the performance of the coupler.

Furthermore, in applicant's own international patent application published on May 25, 2001 under No. WO 01/37013, which is incorporated herein by reference, a method is disclosed and claimed for the fabrication of multiplexing and demultiplexing single-mode fiber couplers by elongating fused fibers by controllably pulling them longitudinally while heating them with a suitable heat source so as to create a coupling zone with an adiabatic profile, and stopping the elongation process when a match point between wavelength period and polarization phase is achieved. In this prior international application, it was found that it is possible to match the wavelength periods and the polarization phase at the same time. It has now been found that this principle can also be used to fabricate a polarization-combining optical coupler in accordance with the present invention.

OBJECTS AND SUMMARY OF THE INVENTION

It is an object of the present invention to create a fiber-fused polarization-combining optical coupler adapted to combine signals originating from two polarization maintaining (PM) fibers; this coupler, in the reverse mode, can also be used as a polarization beam splitter.

Another object is to produce a polarization-combining coupler that would be operational in a broad wavelength bandwidth of at least 8 nm.

A still further object is to manufacture a polarization-combining coupler that has a small insertion loss of less than 0.3 dB.

Other objects and advantages of the present invention will be apparent from the following description thereof.

According to the invention, the novel method for manufacturing the polarization-combining coupler uses the form birefringence of the fused coupler to separate the polarizations. The coupler is manufactured from standard non-birefringent single mode (SM) fibers so as to form an adiabatic tapered profile and preferably have a polarization phase difference between $\phi_x$ and $\phi_y$ along the coupler, which is essentially an odd-multiple of $\pi$, while $\phi_x$ and $\phi_y$ have values which essentially multiples of $\pi$, these conditions prevailing at a predetermined common wavelength. Polarization maintaining (PM) fibers are spliced to the input SM fibers of the coupler, preferably as close as possible to the coupling zone. The splicing can be done either before or after the formation of the coupling zone which is produced by fusion and elongation of the SM fibers. Preferably, however, splicing is done before fusion and elongation of the coupling zone, to provide better control of the operation.

The PM fibers are known to carry optical signals while maintaining polarization orientations. One of the PM fibers is oriented to maintain the polarization along the x-axis and the other along the y-axis so that one of the arms of the coupler is excited by the signal of polarization x and the other by that of the orthogonal polarization y. Because the modes of the two polarizations have a phase difference, which is an odd-multiple of $\pi$ and the accumulated phases have values that are different multiples of $\pi$, one of the polarizations remains in the same fiber as the input fiber while the other is transferred. Since the two polarizations are not injected in the same input fiber, they become combined in the same output fiber.

If a polarization splitter is desired, any polarization state, or even a depolarized signal, introduced into an SM fiber at the output end of the coupler (now serving as input fiber), will be separated into axes x and y by the coupler and transported out of the coupler by the PM fibers as separate orthogonal polarizations x and y respectively.

According to a preferred embodiment of the invention, two PM fibers are first spliced to two SM fibers. Then, the birefringent axes of the PM fibers are aligned on the x and y axes respectively of the coupler. Such alignment can, for example, be performed visually by looking at the birefringent structure in the fibers either sideways or through the ends of the fibers and properly aligning the axes. Thereafter, the SM fibers are stripped of their coating, typically over a length of 35–40 mm, and are held parallel to each other and heated and fused together. Preferably, a small degree of fusion is produced, as explained in applicant's international application WO 01/37013. The fused portion is then drawn while being heated to constitute a tapered shape with an adiabatic profile, thereby producing a coupling zone. This coupling zone is normally produced as close as possible to the PM/SM fiber splices, usually at a distance in the order of 20 mm.

The spectral response of a fused fiber coupler is oscillatory since there are multiple power exchanges between the two fibers along the length of the coupler. The operation of the polarization beam combiner in accordance with this invention relies on an effect associated with the form birefringence exhibited by the fused section of the coupled device. Said form birefringence can be controlled by correspondingly monitoring the temperature of the fibers being drawn. The drawing end point is determined by controlling the power signal at the two output SM fibers of the coupler. Linearly polarized light is fed from the PM fibers, one at a time, into each of the input arms of the coupling zone, and the transmitted power is detected at the output fibers following the coupling zone. The light source and detector combination can be, for example a polarized broadband source and a spectrum polarizer or a tunable laser and a detector, so that the wavelength properties of the couplers can be measured simultaneously with the polarization properties. A maximum power transmission must be found in one of the output fibers at a desired wavelength for the linearly polarized light inputted in each of the two input arms of the coupling zone by the PM fibers, while keeping the insertion loss at a minimum. The drawing process is terminated when the coupling of the output powers in one of the output fibers reaches maximum for both polarizations at a desired wavelength. Said desired wavelength is achieved by controlled drawing of the fibers. This point also corresponds to a minimum transmission to the other unused output fiber.

To summarize, the polarization-combining fused-fiber optical coupler of the present invention comprises a coupling zone made of two non-birefringent single-mode (SM) fibers fused and drawn so as to form an adiabatic tapered profile, this coupling zone having two input arms and two output fibers; and two polarization maintaining (PM) fibers are spliced to the input arms of the coupling zone; the coupler being characterized in that when linearly polarized light is injected into each PM fiber and oriented so that polarization in one PM fiber is orthogonal to that of the other PM fiber, and when this light passes through the input arms into the coupling zone, it combines maximum transmitted power of the two polarizations at a desired common wavelength in one output fiber, with only a minimal power transmission going to the second output fiber. Preferably said coupling zone is so shaped as to have, at the desired common wavelength, a polarization phase difference between accumulated phases $\phi_x$ and $\phi_y$ of a value that is essentially an odd-multiple of $\pi$, while $\phi_x$ and $\phi_y$ have values which are essentially multiples of $\pi$.

The method of manufacturing a polarization-combining fused-fiber optical coupler in accordance with the present invention comprises:

(a) taking two polarization maintaining (PM) fibers having birefringent axes and each having a light input and a light output end;

(b) splicing said polarization maintaining (PM) fibers by their output ends to two non-birefringent single mode (SM) fibers;

(c) aligning the birefringent axes of the PM fibers at 90° of each other, one being aligned with the x-axis and the other with the y-axis of the coupler;

(d) injecting linearly polarized light into a same birefringent axis of each PM fiber so that polarization in one PM fiber output end is orthogonal to that in the other PM fiber output end; and (e) fusing and drawing the two SM fibers near the splicing, to form a coupling zone, the drawing being carried out so as to form an adiabatic tapered profile and is stopped when maximum power transmission at a desired common wavelength is detected in one of the two output SM fibers which extend from the coupling zone.

Preferably, fusing and drawing of the SM fibers is performed so as to produce a polarization phase difference between accumulated phases $\phi_x$ and $\phi_y$ which is essentially an odd-multiple of $\pi$, while $\phi_x$ and $\phi_y$ have values which are essentially multiples of $\pi$.

As already mentioned previously, this invention is not limited to the making of a polarization combiner. It is obvious to a person skilled in the art that this device may also be used as a polarization splitter. In such a case, instead of monitoring power transmission, polarization analysis is needed at the output of the device. The drawing end point of the coupler is reached when the orthogonal polarizations of an input beam are split between the two output ports and thus the coupler acts as a polarization beam splitter.

BRIEF DESCRIPTION OF THE DRAWINGS

A preferred embodiment of the present invention will now be described with reference to the appended drawings, in which.

DETAILED DESCRIPTION OF THE INVENTION

The invention will now be described by way of a preferred, non-limitative embodiment with reference to the appended drawings, where the same features are designated by the same reference numbers.

Figure 1:
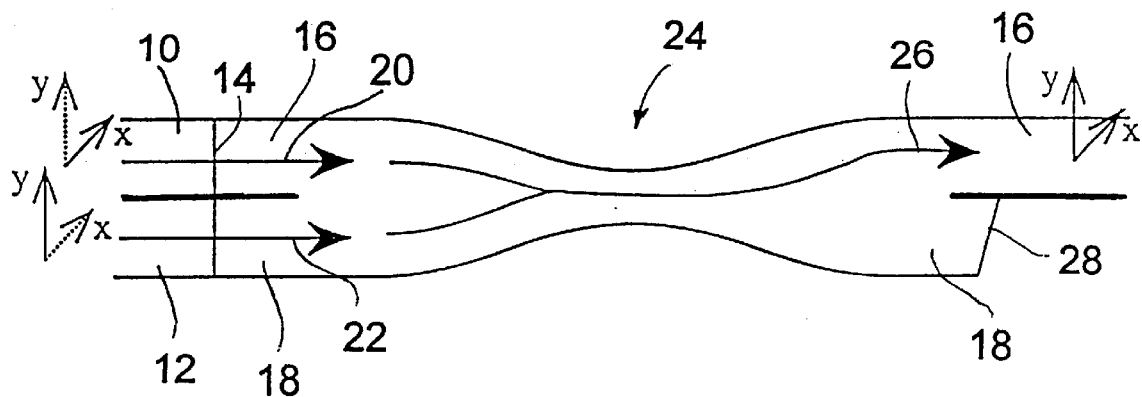
FIG. 1 is a schematic representation of the polarization-combining coupler in accordance with the present invention.

FIG. 1 illustrates the novel polarization-combining coupler arrangement having two PM fibers 10 and 12, the output ends of which are spliced at line 14 to two SM fibers 16 and 18. The PM fibers 10 and 12 are preferably PANDA® and the SM fibers 16 and 18 are preferably SMF-28 of Corning because they can be spliced with very low losses. Light signal with polarization x is injected into PM fiber 10 from a light source (L1 in FIG. 2) and another signal with polarization y is injected into PM fiber 12 from a second light source (L2 in FIG. 2), so that the two polarizations are orthogonal to each other. These polarizations are maintained by the PM fibers 10 and 12 and are injected as such into SM fibers 16 and 18 which constitute the input arms of the coupling zone 24, as shown by arrows 20 and 22. The coupling zone 24 is formed by fusing and elongating fibers 16 and 18 to form an adiabatic coupling taper in which the modes of the two polarizations x and y have a phase difference between accumulated phases $\phi_x$ and $\phi_y$ which is an odd-multiple of $\pi$, while $\phi_x$ and $\phi_y$ have values which are multiples of $\pi$, for a common wavelength. For a broader wavelength range of operations of the coupler, a phase difference of $\pi$ is chosen; this corresponds to the first point in the elongation where the phase condition between the two polarizations is satisfied. The coupler of the present invention is characterized in that the coupling zone 24 is adapted to transfer essentially all power (>99%) at a desired common wavelength into the output end of only one of the fibers, in this case SM fiber 16, as shown by arrow 26, whereas essentially no power is transmitted into the output end of the other fiber 18 which may be terminated by an anti-reflective fiber termination 28. This is quite different, for instance, than the situation disclosed in U.S. Pat. No. 5,064,267 where the coupling region is drawn out until an equal amount of light is detected from each output fiber, which means that each output fiber will receive 50% of the total power, whereas the coupler of the present invention permits to recover essentially all power in a single fiber and to obtain a maximum extinction in the other fiber.

Figure 2:
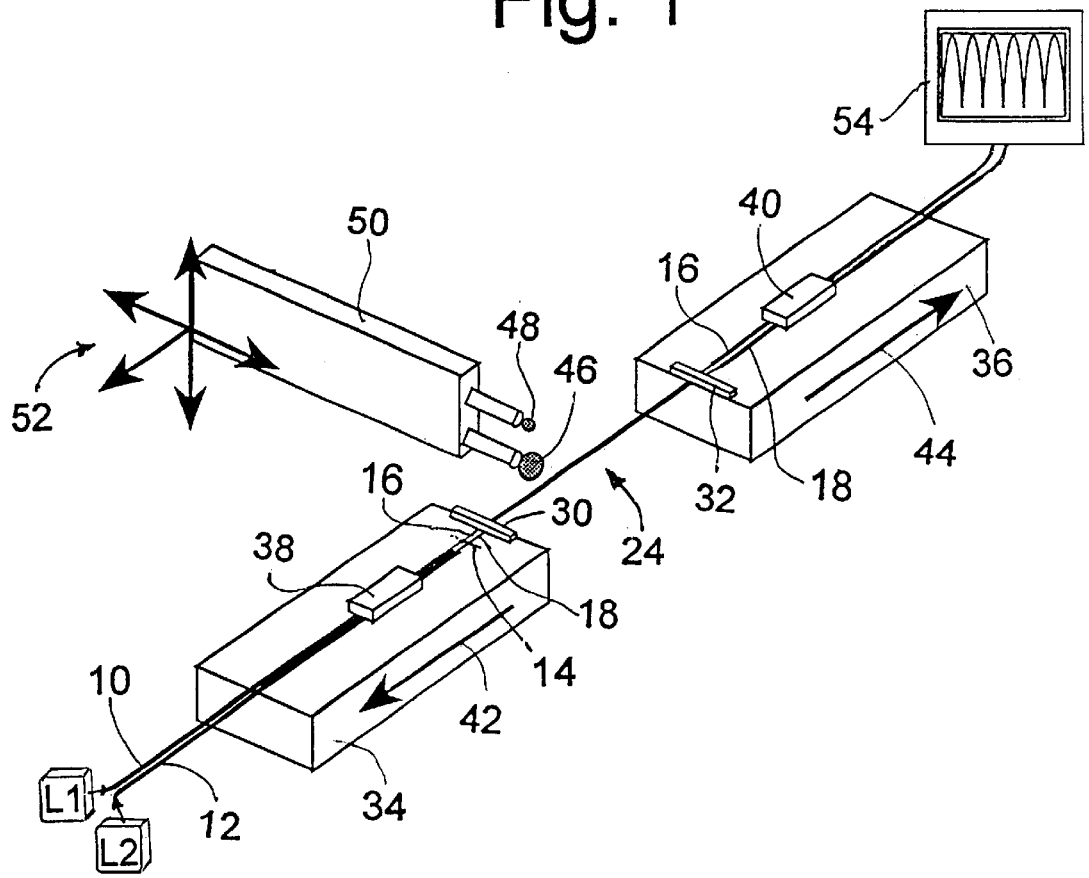
FIG. 2 is a diagrammatic representation of the method of fabrication in accordance with the present invention.

FIG. 2 illustrates the preferred manufacturing method in accordance with the present invention. According to this method, output ends of PM fibers 10 and 12 are spliced at line 14 with ends of SM fibers 16 and 18. A signal is injected from light source L1 into PM fiber 10 having polarization x and another signal is injected from light source L2 into PM fiber 12 having polarization y, the two polarizations being orthogonal. Light sources L1 and L2 are normally a broadband source of light emitting signals with several wavelengths. One can also use only one light source and switch the signals from one fiber to the other.

Following the spliced line 14, the two SM fibers 16 and 18 are stripped off to remove their coating over a length of 35–40 mm and are placed parallel to each other using positioning devices 30 and 32 provided at the edges of motorized stages 34 and 36. PM fibers 10 and 12 are clamped onto stage 34 by means of clamp 38 and SM fibers 16 and 18 are clamped to stage 36 by means of clamp 40.

The motorized stages 34, 36 have precise positioning resolution to provide satisfactory control of the coupling length and of the pulling speed shown by arrows 42 and 44. A heat source 46 and/or 48 is provided on a motorized stage 50 which can be moved in various directions as indicated by arrows 52 to provide controllable heat for fusing and elongating fibers 16 and 18 to form the coupling zone 24 having an adiabatic profile as shown in FIG. 1, with required characteristics. A spectral analyser 54 is provided at the output end of fibers 16 and 18 to monitor the power signal at the output of the two SM fibers 16, 18 as a function of wavelength The drawing of the coupling zone 24 is stopped at the point where the transmission maxima of the two polarizations essentially coincide for a predetermined common wavelength which is achieved by tuning the drawing operation.

Figure 3:
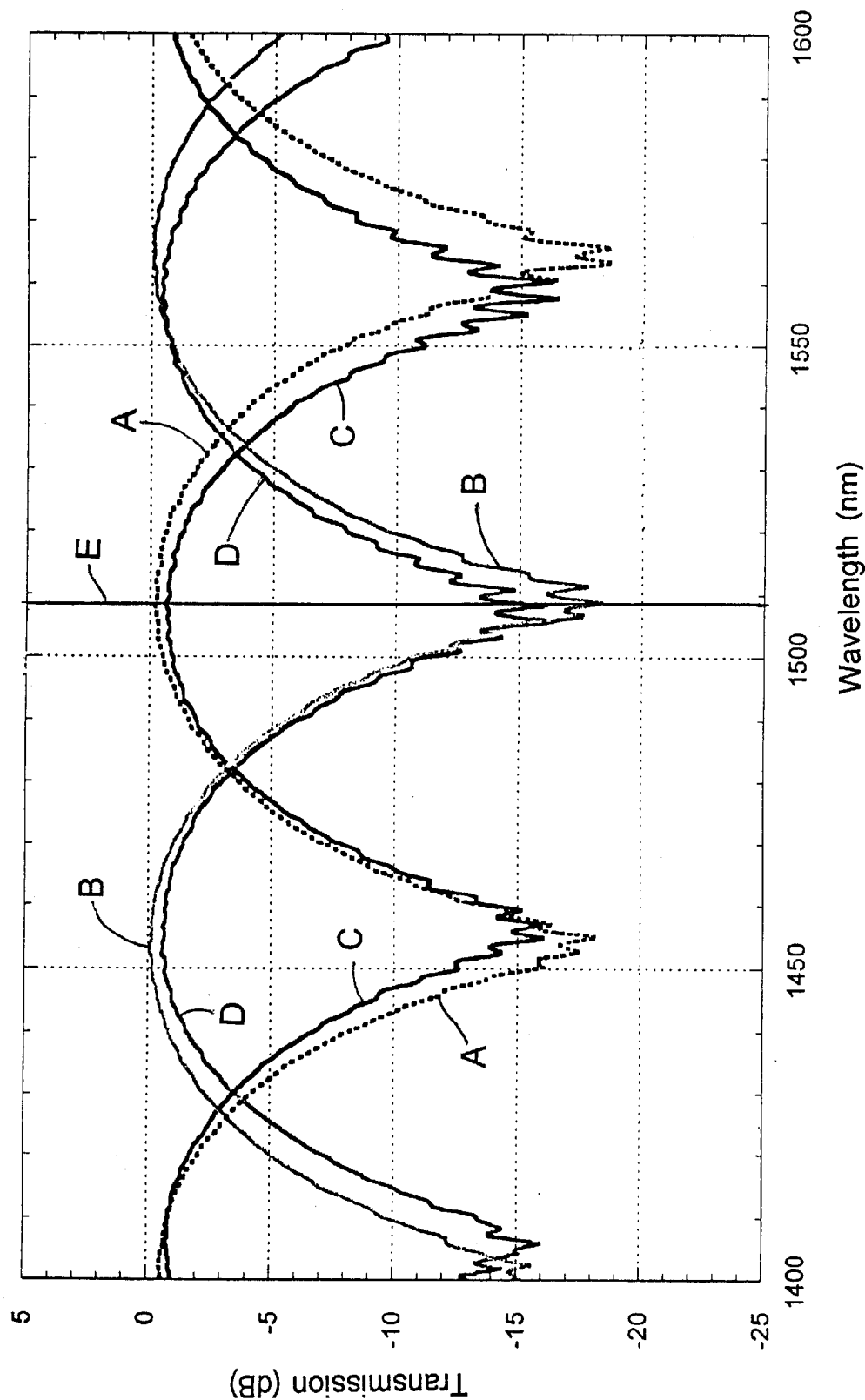
FIG. 3 is a graph showing the spectral response at the end of the fused-fiber coupler elongation process.

FIG. 3 shows an actual spectral response at the end of a drawing process of a polarization-combining coupler of the present invention. The transmission power in dB is plotted in this graph with reference to the wavelength in nm. The polarized signals injected into the PM fibers 10 and 12 are represented in this graph by curves A and B and the power responses at the output SM fibers 16 and 18 are represented by curves C and D. The drawing in this case is stopped at line E where the two signals are essentially in phase with one another at the wavelength of about 1510 and where light transmission from the two polarized signals is farthest apart, thus producing a maximum power transfer to one of the output fibers of the coupler. The length of the drawn coupling zone at the point of stopping the drawing process is usually between 15 and 20 mm. It performs a maximum power transmission of the order of 99% to one of the output SM optical fibers being used. The adiabatic taper of the coupling zone minimizes insertion losses to about 0.15 dB. Moreover, the short coupler makes it possible to obtain a wide wavelength bandwidth greater than 8 nm for an isolation at the outlet of 17 dB or greater. The unused fiber to which essentially no power is transmitted is normally terminated so as to prevent optical return losses. With the coupling zone being between 15 and 20 mm, it is possible to produce an overall polarization-combining coupler having a length between 40 and 70 mm including means for securing the coupler onto a suitable substrate and mounting it in a tube or some other suitable packaging.

Moreover, by using a technique, such as described in applicant's international application WO 01/37013 which has already been mentioned above, one can adjust the wavelength at which the desired phase condition is reached during elongation, by modifying the longitudinal profile of the coupler and the degree of fusion. Thus, by combyning the above described measurement technique with such control of the elongation of the coupler profile, one can realize a high performance fused fiber polarization combiner at any wavelength.

The invention is not limited to the preferred embodiment described above and many modification obvious to those skilled in the art can be made without departing therefrom. For example, once a desired polarization-combining coupler is obtained with satisfactory characteristics, it may be preferable to reproduce it by first drawing the coupling zone 24 and then splicing its input SM fibers to the PM fibers. Also, as already mentioned, the polarization-combining coupler can act as a polarization beam splitter by sending a beam of light in reverse direction which is then split into desired states of polarization by the coupling zone, which states of polarization, in turn, are transported out of the PBS by two PM fibers.

What is claimed is:

1. A polarization-combining fused-fiber optical coupler comprising: a coupling zone made of two non-birefringent single-mode (SM) fibers fused and drawn so as to form an adiabatic tapered profile, said coupling zone having two input arms and two output fibers; and two polarization maintaining (PM) fibers having light input ends and light output ends, said output ends of the PM fibers being spliced to the input arms of the coupling zone, so that when linearly polarized light is injected into the input ends of each PM fiber and oriented to make polarization in one PM fiber orthogonal to that of the other PM fiber at the output ends of the PM fibers, and when said light from the two PM fibers then passes through the input arms into the coupling zone, said coupling zone combines maximum transmitted power of the two polarizations at a desired common wavelength in one output fiber, with only a minimal power transmission going to the second output fiber; characterized in that the adiabatic tapered profile of the coupling zone is so shaped as to have, at the desired common wavelength, a polarization phase difference between accumulated phases $\phi_x$ and $\phi_y$ which is essentially an odd-multiple of $\pi$, while $\phi_x$ and $\phi_y$ have values which are essentially multiples of $\pi$.

2. A polarization-combining fused-fiber optical coupler according to claim 1, characterized in that the polarization phase difference between the accumulated phases $\phi_x$ and $\phi_y$ is $\pi$.

3. A polarization-combining fused-fiber optical coupler comprising: a coupling zone made of two non-birefringent single-mode (SM) fibers fused and drawn so as to form an adiabatic tapered profile, said coupling zone having two input arms and two output fibers; and two polarization maintaining (PM) fibers having light input ends and light output ends, said output ends of the PM fibers being spliced to the input arms of the coupling zone, so that when linearly polarized light is injected into the input ends of each PM fiber and oriented to make polarization in one PM fiber orthogonal to that of the other PM fiber at the output ends of the PM fibers, and when said light from the two PM fibers then passes through the input arms into the coupling zone, said coupling zone combines maximum transmitted power of the two polarizations at a desired common wavelength in one output fiber, with only a minimal power transmission going to the second output fiber; characterized in that the coupling zone is so shaped as to achieve a power transmission of the order of 99% in said one output fiber.

4. A polarization-combining fused-fiber optical coupler comprising: a coupling zone made of two non-birefringent single-mode (SM) fibers fused and drawn so as to form an adiabatic tapered profile, said coupling zone having two input arms and two output fibers; and two polarization maintaining (PM) fibers having light input ends and light output ends, said output ends of the PM fibers being spliced to the input arms of the coupling zone, so that when linearly polarized light is injected into the input ends of each PM fiber and oriented to make polarization in one PM fiber orthogonal to that of the other PM fiber at the output ends of the PM fibers, and when said light from the two PM fibers then passes through the input arms into the coupling zone, said coupling zone combines maximum transmitted power of the two polarizations at a desired common wavelength in one output fiber, with only a minimal power transmission going to the second output fiber; characterized in that the coupling zone is 15 to 20 mm long and has a wavelength bandwidth greater than 8 nm for an isolation of at least 17 dB.

5. A polarization-combining fused-fiber optical coupler according to claim 1, characterized in that said coupler has an insertion loss of less than 0.3 dB.

6. A polarization-combining fused-fiber optical coupler comprising: a coupling zone made of two non-birefringent single-mode (SM) fibers fused and drawn so as to form an adiabatic tapered profile, said coupling zone having two input arms and two output fibers; and two polarization maintaining (PM) fibers having light input ends and light output ends, said output ends of the PM fibers being spliced to the input arms of the coupling zone, so that when linearly polarized light is injected into the input ends of each PM fiber and oriented to make polarization in one PM fiber orthogonal to that of the other PM fiber at the output ends of the PM fibers, and when said light from the two PM fibers then passes through the input arms into the coupling zone, said coupling zone combines maximum transmitted power of the two polarizations at a desired common wavelength in one output fiber, with only a minimal power transmission going to the second output fiber; characterized in that the second output fiber has a termination adapted to prevent optical return losses.

7. A polarization-combining fused-fiber optical coupler according to claim 1, characterized in that it serves as a polarization beam splitter when acting in reverse direction, namely when a beam of light is injected into the coupling zone through one of its output fibers and is split into two linear polarizations within said coupling zone, which polarizations then travel in and are maintained by the PM fibers.

8. A method of manufacturing a polarization-combining fused-fiber optical coupler which comprises:
(a) taking two polarization maintaining (PM) fibers having birefringent axes and each having a light input and a light output end;
(b) splicing said polarization maintaining (PM) fibers by their output ends to two non-birefringent single mode (SM) fibers;
(c) aligning the birefringent axes of the PM fibers at 90° of each other, one being aligned with the x-axis and the other with the y-axis of the coupler;
(d) injecting linearly polarized light into a same birefringent axis of each PM fiber so that polarization in one PM fiber output end is orthogonal to that in the other PM fiber output end;
(e) fusing and drawing the two SM fibers near the splicing, to form a coupling zone, the drawing being carried out so as to form an adiabatic tapered profile and is stopped when maximum power transmission at a desired common wavelength is detected in one of the two output SM fibers which extend from the coupling zone.

9. Method according to claim 8, in which the fusing and drawing are carried out so as to form an adiabatic profile which, at the desired common wavelength, produces a polarization phase difference between accumulated phases $\phi_x$ and $\phi_y$ which is essentially an odd-multiple of $\pi$, while $\phi_x$ and $\phi_y$ have values which are essentially multiples of $\pi$.

10. Method according to claim 8, in which the splicing between the PM fibers and SM fibers is done as close as possible to the coupling zone.

11. Method according to claim 8, in which the linearly polarized light injected into each PM fiber is oriented in x-axis in one fiber and y-axis in the other with reference to the alignment of the coupling zone.

12. Method according to claim 8, in which the linearly polarized light is injected into each PM fiber input end by a separate light source having a broad wavelength bandwidth.

13. Method according to claim 8, in which the linearly polarized light is injected into each PM fiber input end from a same light source, switching from one PM fiber to the other.

14. Method according to claim 8, in which the two SM fibers are lightly fused prior to being heated and drawn to form the coupling zone.

15. Method according to claim 8, in which the drawing operation is monitored by a spectral analyser and is stopped when maximum power transmission into one SM output fiber is reached at the desired common wavelength.

16. Method according to claim 8, in which the desired common wavelength is tuned by precise drawing of the coupling zone.

17. Method according to claim 8, in which the other, unused SM fiber, into which only minimal power transmission is directed, is terminated at the output of the coupling zone so as to prevent optical return losses.

18. Method according to claim 8, in which splicing of the two PM fibers is performed before or after formation of the coupling zone.

19. A polarization-combining fused-fiber optical coupler according to claim 3, characterized in that said coupler has an insertion loss of less than 0.3 dB.

20. A polarization-combining fused-fiber optical coupler according to claim 4, characterized in that said coupler has an insertion loss of less than 0.3 dB.

21. A polarization-combining fused-fiber optical coupler according to claim 6, characterized in that said coupler has an insertion loss of less than 0.3 dB.

22. A polarization-combining fused-fiber optical coupler according to claim 3, characterized in that it serves as a polarization beam splitter when acting in reverse direction, namely when a beam of light is injected into the coupling zone through one of its output fibers and is split into two linear polarizations within said coupling zone, which polarizations then travel in and are maintained by the PM fibers.

23. A polarization-combining fused-fiber optical coupler according to claim 4, characterized in that it serves as a polarization beam splitter when acting in reverse direction, namely when a beam of light is injected into the coupling zone through one of its output fibers and is split into two linear polarizations within said coupling zone, which polarizations then travel in and are maintained by the PM fibers.

24. A polarization-combining fused-fiber optical coupler according to claim 6, characterized in that it serves as a polarization beam splitter when acting in reverse direction, namely when a beam of light is injected into the coupling zone through one of its output fibers and is split into two linear polarizations within said coupling zone, which polarizations then travel in and are maintained by the PM fibers.

* * * * *